United States Patent [19]

Minning et al.

[11] Patent Number: 4,991,696
[45] Date of Patent: Feb. 12, 1991

[54] BRAKE SHOE ADJUSTMENT DEVICE

[75] Inventors: Manfred Minning, Ebersbach; Thomas Müller, Wernau, both of Fed. Rep. of Germany

[73] Assignee: Daimler-Benz

[21] Appl. No.: 419,081

[22] Filed: Oct. 6, 1989

[30] Foreign Application Priority Data

Oct. 12, 1988 [DE] Fed. Rep. of Germany ....... 3834714

[51] Int. Cl.⁵ .............................................. F16D 65/46
[52] U.S. Cl. ............................ 188/79.61; 188/196 M; 192/111 T
[58] Field of Search ............. 188/196 M, 79.57, 79.61, 188/196 J; 192/111 T

[56] References Cited

U.S. PATENT DOCUMENTS

| 1,757,348 | 5/1930 | Buskirk | 188/79.61 |
| 1,936,943 | 11/1933 | Kohr | 188/79.61 |
| 1,950,625 | 3/1934 | Parker et al. | 188/79.61 |
| 2,294,293 | 8/1942 | Goepfrich | 188/79.61 |
| 2,316,450 | 4/1943 | Parnell | 188/79.61 X |

FOREIGN PATENT DOCUMENTS

| 703813 | 3/1941 | Fed. Rep. of Germany . | |
| 3438402 | 4/1986 | Fed. Rep. of Germany . | |
| 799738 | 6/1936 | France . | |
| 1404947 | 8/1963 | France . | |
| 256461 | 8/1926 | United Kingdom | 188/79.61 |
| 270880 | 5/1927 | United Kingdom | 188/79.61 |
| 335260 | 9/1930 | United Kingdom | 188/79.57 |

Primary Examiner—George A. Halvosa
Attorney, Agent, or Firm—Evenson, Wands, Edwards, Lenahan & McKeown

[57] ABSTRACT

A brake shoe adjustment device for internally mounted shoe brakes is arranged between mutually neighboring ends of two brake shoes which are connected to each other via a tension spring. To minimize parts, size and cost the adjustment device has two mutually opposite spreading elements, each of which is held by one brake shoe end. One of the elements is equipped with a threaded shank that cooperates with a threaded bore of the other element. The elements are axially displaceable by a worm wheel gear which rotates the shank in response to turning by an adjusting tool.

3 Claims, 3 Drawing Sheets

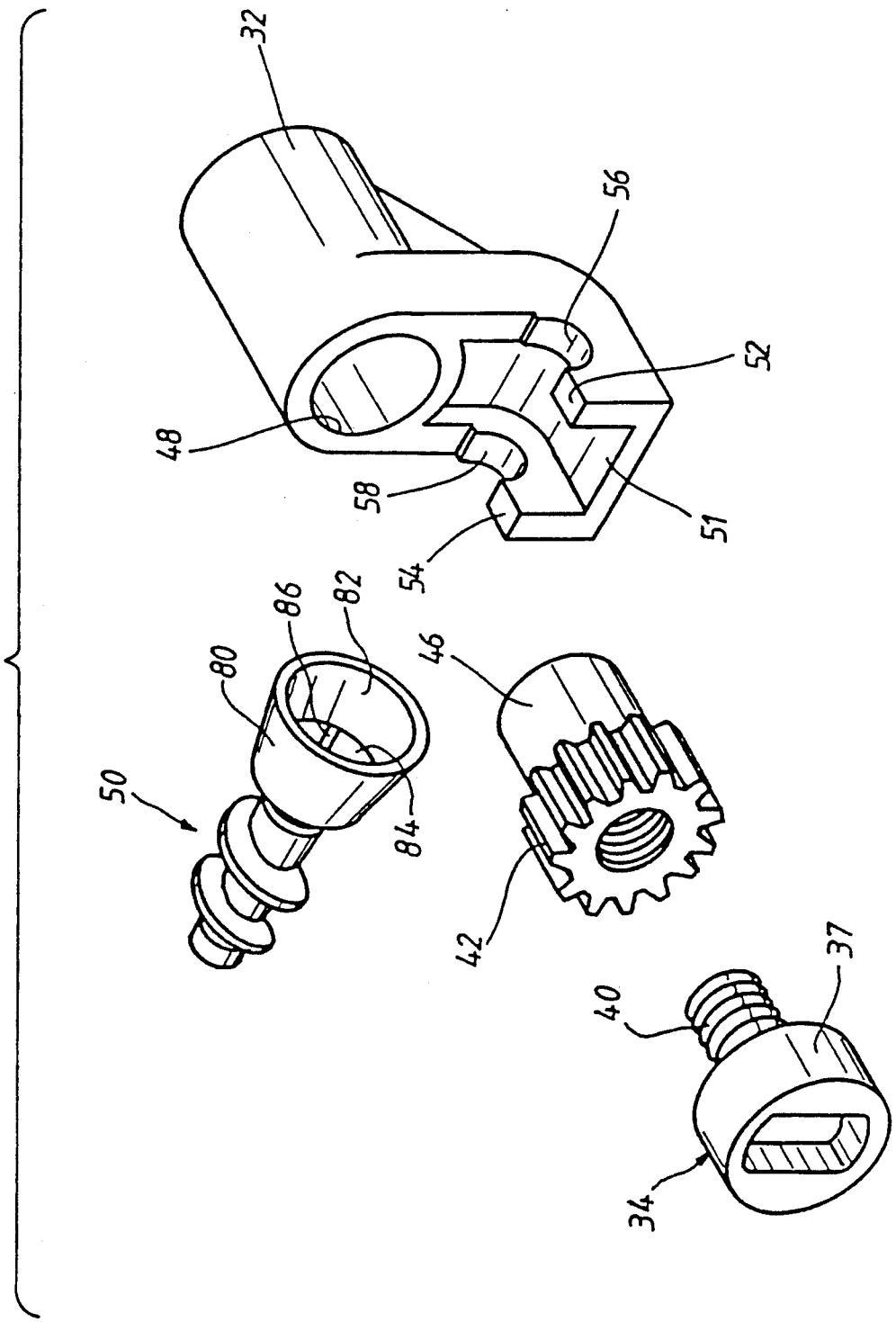

BRAKE SHOE ADJUSTMENT DEVICE

BACKGROUND AND SUMMARY OF THE INVENTION

The invention relates to a brake shoe adjustment device for internally mounted shoe brakes, which is arranged between mutually neighboring ends of two brake shoes which are connected to each other via a tension spring. The brake shoes are held in position by mutually opposite spreading elements connected to each brake shoe end. One spreading element has a threaded shank which is screwed into an internal threaded bore of a worm wheel which in turn is mounted in a bearing bore of a receptacle. The worm wheel can be turned by means of a worm mounted in the receptacle. The worm wheel axis is normal to the axis of a brake drum. The worm can be turned by means of an adjusting tool which can be applied to it.

A brake shoe adjustment device of this general type is known from French Patent Specification No. 799,738. There, a cylindrical guide, with screw wheel toothing worked into the outer periphery in its central region, is mounted in a bore passing through the receptacle. The threaded bore for one spreading element is arranged centrally in the one face end of this guide and a bore for receiving a guide pin of the other spreading element is arranged centrally in its other face end.

The worm meshing with this toothing is mounted axially displaceably in the receptacle. Therefore, in order to be able to introduce the guide into the bore of the receptacle, its outside diameter is reduced (on its end piece having the pin bore) into the region of the toothing in such a way that the guide can be brought into engagement with the worm upon insertion into the bore of the receptacle. In order to secure the guide axially in the receptacle after its assembly, a stop and guide ring having essentially the bore diameter of the receptacle is introduced into the bore and pushed with radial pretension onto the guide end piece of reduced diameter. This stop and guide ring projects slightly beyond the cylindrical face end of the guide and is supported on the spreading element bearing the guide pin.

For adjusting the brake shoes, an adjusting tool is introduced to the inside shoe brake from the outside of the wheel via a wheel bore for a wheel bolt and must be applied to a worm wheel shank.

This known design requires a relatively large guide length, both for the guide forming the worm wheel and for the receptacle receiving and axially guiding the guide, which has to be fastened on the brake anchor plate. Such a design thus provides an adjustment device with a large dead weight.

Furthermore, this design requires an arrangement of two spreading elements which can be displaced axially by the guide in mutually opposite directions as well as an additional stop and guide ring, which further increases the weight, quite apart from the constructional outlay and the required axial securement of the worm in the receptacle.

It is therefore the object of the invention to provide a brake shoe adjustment device of the generic type which makes possible a reduction in: the number of individual parts, overall size and weight, and which is distinguished by a simple assembly of the worm wheel and the worm.

This object is achieved by having the worm wheel mounted with a laterally protruding bearing neck in the bearing bore of the receptacle forming the other spreading element. The receptacle has, adjacent to the periphery of the worm wheel, two bearing webs, which are arranged a distance from each other in the axial direction of the worm and which are each equipped with one bearing recess, which opens facing the worm wheel side, for bearing support of the worm.

The design comprises just one spreading element assigned to the receptacle. The threaded shank of the element is guided in the central threaded bore of the worm wheel, which protrudes with its bearing neck into the bearing bore of the receptacle and is supported by its one face on the receptacle.

The receptacle is supported on one of the two brake shoe ends and thus at that time also forms the other spreading element. This support of the receptacle on the brake shoe allows a stationary lashing of the latter to be dispensed with and permits the adjustment device to be merely clamped between the two brake shoes.

This means that the assembly of the worm gear is very simply accomplished by first placing the worm in the edge-open bearing recesses and subsequently bringing the worm wheel, preferably screwed in advance onto the threaded shank of the one spreading element, with the worm and with a bearing shank formed thereupon, into engagement with a bearing opening of the receptacle forming the other spreading element.

It is also advantageous if the adjusting device has a catch mechanism which utilizes the tension spring as the catching element and which engages with catch arrangements provided at the free face end of the worm upon its turning.

Other objects, advantages and novel features of the present invention will become apparent from the following detailed description of the invention when considered in conjunction with the accompanying drawings.

BRIEF DESCRIPTION OF THE DRAWINGS

FIG. 5 shows an exploded drawing of the brake shoe adjustment device.

DETAILED DESCRIPTION OF THE DRAWINGS

Figure 1:
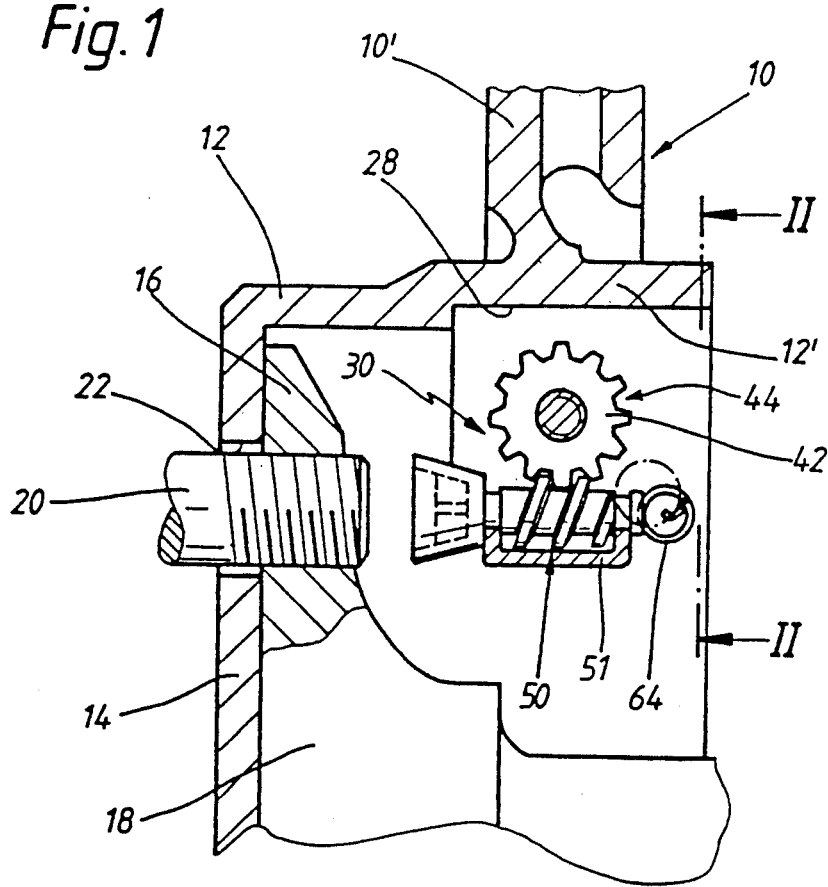
FIG. 1 shows a partial longitudinal section through a brake disk of a disk brake, equipped with an inside shoe brake.
Figure 2:
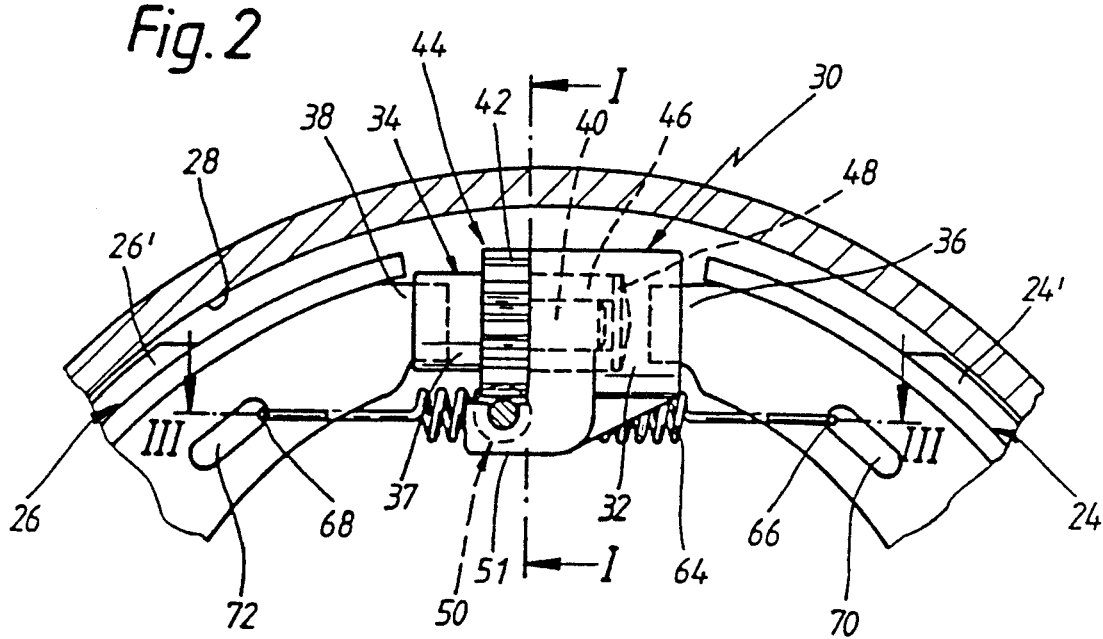
FIG. 2 shows a partial section along the line II—II of FIG. 1.

FIGS. 1 and 2 show an internally ventilated brake disk 10, which is equipped with a disk cup 12. A cup bottom 14 of the wheel disk cup 12 is fixed to the hub flange 16 of a wheel hub 18 by wheel bolts 20. For this purpose, the cup bottom 14 contains a corresponding number of bores 22 allowing for the passage of wheel bolts 20.

In the region of the disk-shaped part 10' of the brake disk 10, the disk cup 12 forms a brake drum 12'. Two internal brake shoes 24 and 26 are installed inwardly of the drum 12' such that on applying the brakes, brake lining 24' and 26' expand radially outwardly to the drum inside circumferential surface 28. The brake shoes operate with a self-energizing effect, i.e. the self-energization of the leading brake shoe being utilized for the adaptation of the other brake shoe.

The two brake shoes 24 and 26 have a brake shoe adjustment device 30 and with the aid of which, the said brake shoes can be initially set, or brake play developing due to a wearing of the brake linings 24', 26' can be reduced to a specified amount manually. This brake shoe adjustment device 30 is clamped between two mutually opposite ends of the two brake shoes 24 and 26. It has two mutually opposite spreading elements 32 and 34, which are non-rotatably held on mutually facing flat extensions 36 and 38 of the brake shoes 24 and 26. The spreading elements 34 form a head bolt, the bolt head 37 of which is in engagement with the brake shoe extension 38, while the threaded shank 40 of which is screwed into an internal thread of a worm wheel 42 of a worm wheel gear 44. The worm wheel 42 has a projecting bearing neck 46 at the side by which it is rotatably mounted in a bearing bore 48 of the spreading element 32. The threaded shank 40 of the spreading element 34 also protrudes into this bearing bore.

A worm 50, which extends perpendicular to the axis of the worm wheel 42 and parallel to the drum axis, is in engagement with the worm wheel 42.

As can be seen from FIG. 1, the axis of the worm 50 lies on a pitch circle of the bores 22 of the cup bottom 14 and the corresponding threaded bores of the hub flange 16, so that the worm 50 can be turned by removing a wheel bolt 20 and vehicle wheel and then inserting an adjusting tool into the mutually aligned wheel bolt bores.

The worm wheel 42 is preferably straight-toothed, in order to allow production by a punching operation. In order to ensure a self-locking design of the worm wheel gear 44, the worm 50 engages the straight toothing of the wheel 42 at an axial angle of about 90°.

The spreading element 32 forms a receptacle for the worm 50 and the worm wheel 42. According to FIG. 2, below the worm wheel 42 is a bearing extension 51, which is equipped with two upwardly directed bearing limbs 52 and 54 (FIG. 3), which are parallel and spaced from each other in the axial direction of the worm 50 and which have an upwardly open bearing recess 56 and 58, into which the worm 50 can be placed from above. For axial securement, the bearing limbs 52 and 54 are each equipped with circumferential grooves 60 and 62 into which the ends of the worm gear 50 engage.

A tension spring 64 is hung with hook-like end pieces 66 and 68 into hanging slits 70 and 72 on the two brake shoes 24 and 26 in order to keep the flat extensions 36 and 38 of the two brake shoes 24 and 26 in constant engagement with the corresponding spreading elements 32 and 34 of the brake shoe adjustment device 30. The latter is thereby clamped securely in place between the two brake shoe ends.

Figure 4:
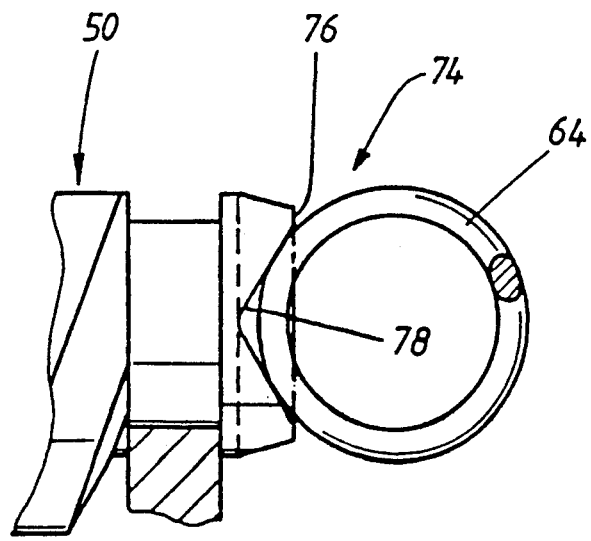
FIG. 4 shows a cut-out indicated in FIG. 1 by a dot-dashed circle, on an enlarged scales.

The tension spring 64 forms a part of a catch device 74, by which the worm 50 can be locked in a preselected rotation position in such a way that it cannot turn even under the effects of strong vibration during vehicle use. Consequently the set easing play cannot change. FIG. 4 shows both the rear face end of the worm 50 and the tension spring 64 that form part of this catch device 74. Two slit shaped depressions 78, which are mutually at an angle of 90° and taper inwards in the form of a wedge, are made in the face 76 of the worm 50. Alternatively, the face end of the worm 50 could also be designed as a polygon.

Figure 3:
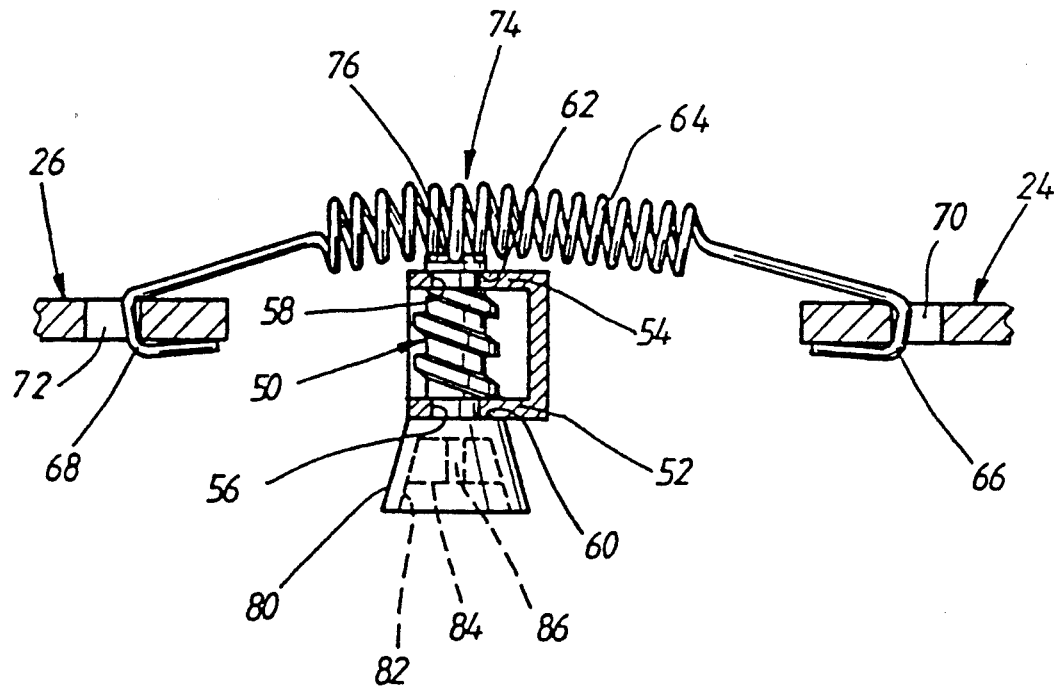
FIG. 3 shows a partial section along the line of III—III of FIG. 2.

As can be seen from FIG. 3, the free face end 76 of the worm 50 is assigned to the tension spring 64 such that the spring engages in one of the wedge-shaped depressions 78 under pretension and accordingly fulfills the function of a catch element of the overrunable catch device 74. This catch device 74 thereby offers the major advantage that an extremely effective locking is achieved with a tension spring 64 with relatively low tensile force. As concerns the self-locking design of the worm wheel gear 44, a clicking noise of the tension spring 64 is clearly audible during the tripping or turning of the worm 50 when it catches in the wedge-shaped depressions 78. The clicking provides information for the setting of easing play.

To apply the adjusting tool, the worm 50 has a tool receiving head 80, which is preferably equipped with a conical depression 82 and in the bottom 84 of which a cross slit 86 is made. The adjusting tool has a shank, the free end of which is designed so as to be complementary to the conical recess 82. The latter ensures that the tool shank can be reliably applied to and brought into engagement with the cross slit 86 without looking.

This design of the tool receiving head 80 takes on particular significance inasmuch as it makes it possible to assemble vehicle wheels by means of a robot tool which is to be introduced into a corresponding wheel bolt bore and is able to establish a reliable effective connection with the worm 50. This is true even in the event of the worm not being in exact alignment with the axis of the corresponding wheel bore. The conical recess 82 of the tool receiving head 80 in this case ensures an independent centering of the tool shank on the worm 50.

Although the present invention has been described and illustrated in detail, it is to be clearly understood that the same is by way of illustration and example only. and is not to be taken by way of limitation. The spirit and scope of the present invention are to be limited only by the terms of the appended claims.

What is claimed:

1. A brake shoe adjustment device for shoe brakes internally mounted in a brake drum and arranged between mutually neighboring ends of two brake shoes, which neighboring ends are connected to each other by a tension spring,
   comprising mutually opposite spreading elements holding the neighboring ends in a desired position;
   a receptacle provided with a worm operatively mounted thereon, a baring bore and worm wheel operatively mounted in the bearing bore, said receptacle constituting one of the spreading elements;
   another of the spreading elements having a threaded shank screwed into an internal threaded bore of the worm wheel;
   the worm wheel being operatively engaged with the worm for turning via an adjusting tool; and
   an axis of the worm wheel being disposed normal to an axis of the brake drum;
   wherein the operative mounting of the worm wheel in the receptacle is provided by a laterally protruding bearing neck of the worm wheel extending into the bearing bore of the receptacle;
   the receptacle has two bearing webs arranged adjacent to the periphery of the worm wheel and spaced from one another in the axial direction of the worm; and each bearing web has means which opens facing a side of the worm wheel for bearing support of the worm.

2. A brake shoe adjusting device according to claim 1, wherein the worm wheel is a toothed spur wheel, and a catch means is provided for locking the worm in a desired position.

3. A brake shoe adjusting device according to claim 2, wherein the catch means comprises the tension spring which acts as a catching element and catch arrangements provided at a free face end of the worm such that, upon turning of the worm, the catching element engages the catch arrangements.

* * * * *